(12) United States Patent
Hoppe et al.

(10) Patent No.: US 7,271,509 B2
(45) Date of Patent: Sep. 18, 2007

(54) POLYGONAL STRUCTURE OF A LINEAR MOTOR WITH RING WINDING

(75) Inventors: Thomas Hoppe, Schwabhausen (DE); Zeljko Jajtic, München (DE)

(73) Assignee: Siemens Aktiengesellschaft, München (DE)

( * ) Notice: Subject to any disclaimer, the term of this patent is extended or adjusted under 35 U.S.C. 154(b) by 364 days.

(21) Appl. No.: 10/882,095

(22) Filed: Jun. 30, 2004

(65) Prior Publication Data

US 2005/0006959 A1      Jan. 13, 2005

(30) Foreign Application Priority Data

Jul. 1, 2003    (DE) ................ 103 29 651

(51) Int. Cl.
*H02K 41/02*  (2006.01)

(52) U.S. Cl. .......................................... 310/12

(58) Field of Classification Search ............. 310/12; 104/290, 292–294
See application file for complete search history.

(56) References Cited

U.S. PATENT DOCUMENTS

| | | | | |
|---|---|---|---|---|
| 2,731,212 A * | 1/1956 | Baker | ................ | 242/419.3 |
| 3,602,745 A * | 8/1971 | Davis | ................ | 310/13 |
| 3,770,995 A * | 11/1973 | Eastham et al. | ........... | 104/294 |
| 3,802,349 A * | 4/1974 | Guimbal | ................ | 104/292 |
| 3,828,211 A * | 8/1974 | Laronze | ................ | 310/13 |
| 3,850,108 A * | 11/1974 | Winkle | ................ | 104/281 |
| 3,886,383 A * | 5/1975 | Ross et al. | ................ | 310/12 |
| 4,241,268 A * | 12/1980 | Popov et al. | ................ | 310/13 |
| 4,793,263 A * | 12/1988 | Basic et al. | ................ | 104/282 |
| 5,606,205 A * | 2/1997 | Defontaine et al. | ........... | 310/12 |
| 5,844,332 A * | 12/1998 | Lee | ................ | 310/12 |
| 6,329,728 B1 * | 12/2001 | Kitazawa et al. | ............. | 310/14 |
| 6,633,097 B2 * | 10/2003 | Dunlap et al. | ................ | 310/54 |
| 6,879,064 B2 * | 4/2005 | Kobayashi et al. | ........... | 310/12 |

FOREIGN PATENT DOCUMENTS

| | | |
|---|---|---|
| DE | 196 41 879 A1 | 4/1998 |
| DE | 198 46 923 C1 | 11/2000 |
| EP | 0 744 815 A2 | 11/1996 |
| EP | 1 300 932 A2 | 4/2003 |
| JP | 07007909 A | 1/1995 |
| JP | 2002359962 A | 12/2002 |

OTHER PUBLICATIONS

Machine Translation from JPO Website of JP-2002-359962, To et al., Dec. 13, 2002.*

* cited by examiner

*Primary Examiner*—Burton Mullins
(74) *Attorney, Agent, or Firm*—Henry M. Feiereisen

(57) ABSTRACT

A linear motor includes a primary having lamination stacks, which are arranged to realize a polygonal configuration of the primary, and winding coils having windings wrapped about the lamination stacks in parallel relationship to an outer periphery of the primary. Each lamination stack is made of elongate sheets extending in parallel relationship to a center axis of the motor. The lamination stacks are modules that can be combined in any number or arrangement to form a primary best suited for linear motors of desired power output.

9 Claims, 8 Drawing Sheets

POLYGONAL STRUCTURE OF A LINEAR MOTOR WITH RING WINDING

CROSS-REFERENCES TO RELATED APPLICATIONS

This application claims the priority of German Patent Application, Serial No. 103 29 651.4, filed Jul. 1, 2003, pursuant to 35 U.S.C. 119(a)-(d), the disclosure of which is incorporated herein by reference.

BACKGROUND OF THE INVENTION

The present invention relates, in general, to a linear motor, and more particularly to a linear motor of polygonal cross section. The present invention further relates to a method of making a linear motor.

In this application, the term "polygonal" is not limited to a closed plane figure bounded by straight lines, but should be construed to also encompass shapes with curved or rounded corners.

Linear motors of a type involved here include typically a primary, which is comprised of several lamination stacks so arranged as to form a polygon structure, and a secondary having permanent magnets to generate a magnetic field. Mechanical engineering and plant construction increasingly use linear motors as electric direct drives because of the attainable control dynamics, high positional accuracy, attainable accelerations and speeds as well as long travel paths. The primary has current-carrying coils to generate a variable magnetic field which in cooperation with the magnetic field of the secondary causes a movement of the primary in relation to the secondary. More and more, there is a demand for further increase in the thrust force.

One approach to address this demand involves the construction of a double-sided linear motor through addition of a second primary to a single-sided linear motor so as to realize a doubling of the thrust force. Another approach is described in European patent publication EP 0 744 815 which discloses a polygonal linear motor. The linear motor has a primary which is surrounded by a secondary having permanent magnets which are disposed on a carrier of polygonal cross section. The primary has a retention arm which extends through a gap of the carrier for the secondary to the outside for connection to a linear guide.

However, for a number of reasons, the various proposals are endowed with drawbacks and shortcomings relating for example to manufacturing techniques or to the effect that is hoped to be obtained but may not always be realized.

It would therefore be desirable and advantageous to provide an improved linear motor which obviates prior art shortcomings and which is simple in structure and compact which still producing high power output and which allows modification in a simple and cost-efficient manner in order to cover a wide power range.

SUMMARY OF THE INVENTION

According to one aspect of the present invention, a linear motor comprises a primary including lamination stacks which are arranged to realize a polygonal configuration of the primary, and winding coils having windings wrapped about the lamination stacks in substantial parallel relationship to an outer periphery of the primary, with each lamination stack made up of elongate sheets which extend in parallel relationship to a center axis of the motor.

The present invention resolves prior art problems by providing a modular configuration of the primary of the linear motor in the form of several lamination stacks. As a consequence, linear motors can be constructed with varying thrust force in a simple manner by assembling the primary to suit the desired thrust force. The number of components to be assembled is hereby easy to manage. The lamination stacks of the primary are wrapped around by coils. Compared to the conventional approach to pre-wound lamination stacks of primary parts of single motors, the overall winding process is appreciably reduced in accordance with the present invention as a significantly smaller number of coils must be wound. Moreover, wrapping the windings in accordance with the present invention results in a reduced length of the winding ends in comparison to individually wound lamination stacks with windings whose axes typically extend perpendicular to the longitudinal direction of the lamination stack.

According to another feature of the present invention, the polygonal configuration defines several sides, at least one of the sides may be characterized by an absence of a lamination stack.

According to another feature of the present invention, the primary may be arranged on the inside and the secondary may be arranged on the outside. As an alternative, the primary may be arranged on the outside and the secondary may be arranged on the inside.

According to another feature of the present invention, the lamination stacks are formed with slots, whereby each of the slots may contain one or more winding coils.

According to another feature of the present invention, the windings may be connected to form an exciter coil winding structure, or may be connected to form a lap winding structure.

According to another feature of the present invention, a cooling coil may extend in the form of a helix from one end of the linear motor to another end of the linear motor.

According to another aspect of the present invention, a method of making a linear motor includes the steps of wrapping a wire directly in slots of a lamination stack to form wrap-around coils, and connecting the coils by deflecting the wire from one slot into a following one of the slots during the wrapping step.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1A:
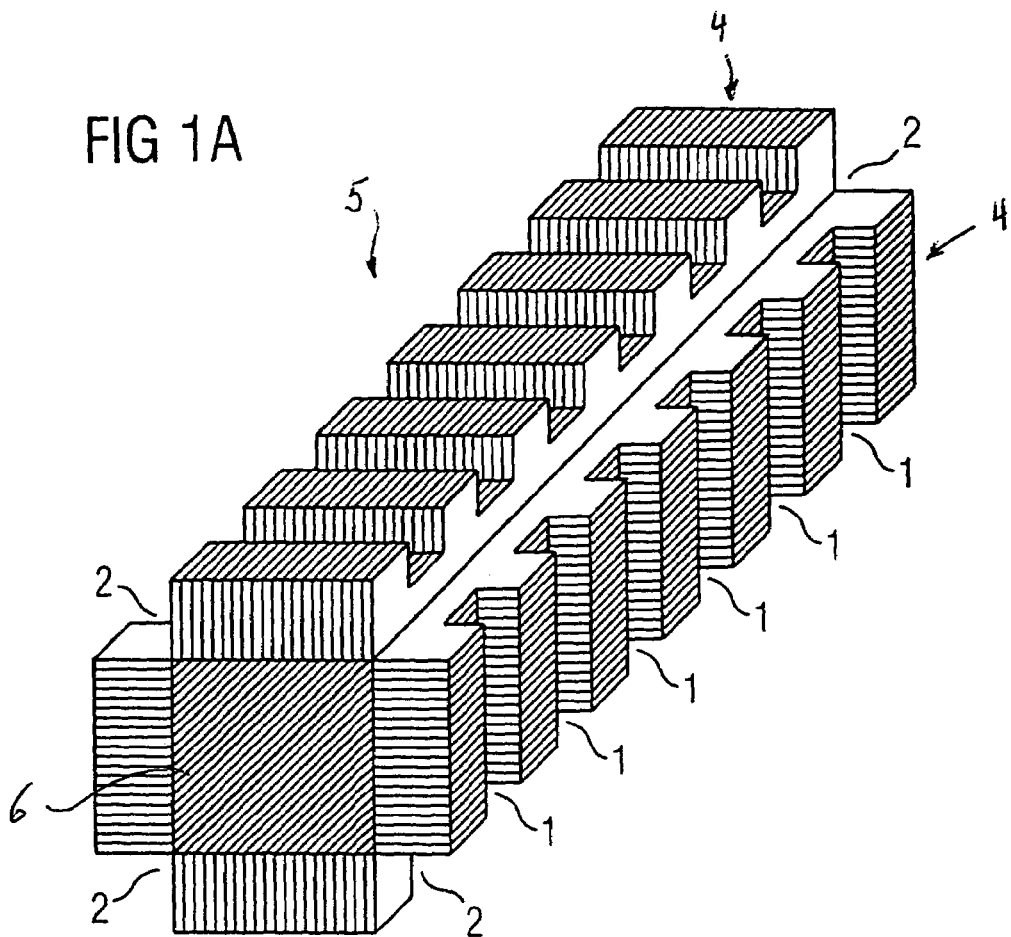
FIG. 1A is a perspective illustration of one embodiment of a primary without winding and with four lamination stacks for inside disposition in a linear motor in accordance with the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1A, there is shown a perspective illustration of one embodiment of a primary according to the present invention, generally designated by reference numeral 5 and having a generally square configuration. The primary 5 is part of a linear motor and includes a square core 6 and an arrangement of four lamination stacks 4 disposed upon the sides of the core 6. The primary 5 is hereby arranged on the inside, while a secondary 7 (FIG. 5A) is arranged on the outside. Of course, it is certainly conceivable to arrange the secondary on the inside and the primary on the outside.

Figure 1B:
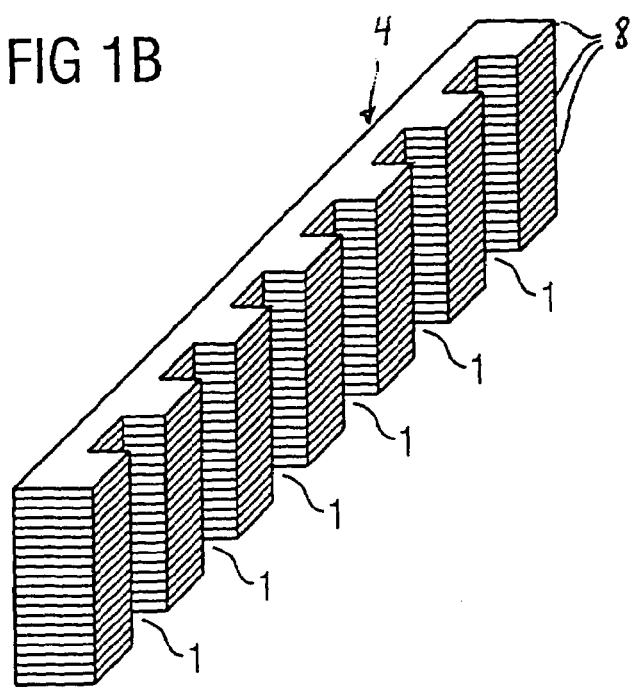
FIG. 1B is a perspective illustration of an individual lamination stack of the primary of FIG. 1A.

Each of the lamination stacks 4, as shown in FIG. 1B, is made up of single elongate sheets 8 extending in longitudinal direction of the core 6 to suppress eddy currents. The disposition of the primary 5 on the inside has technological advantages because, as shown in FIG. 2, wrap-around winding coils 3 can be wound directly into slots 1 in the sheets 8 of the lamination stacks 4.

Figure 2:
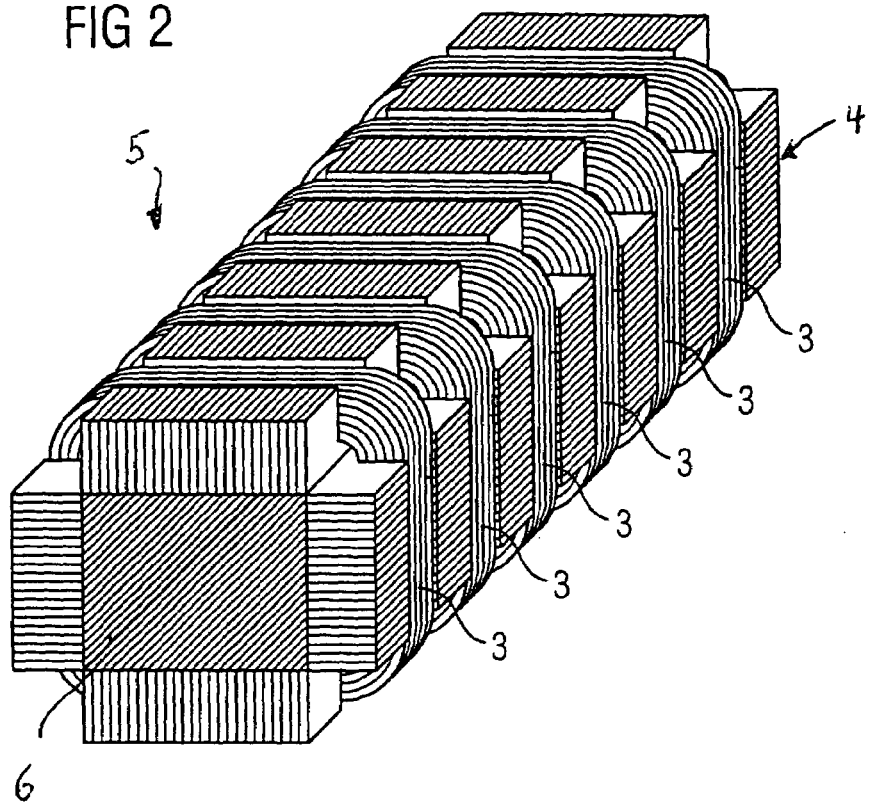
FIG. 2 is a perspective illustration of the primary with windings.

FIG. 2 shows a perspective illustration of the primary 5 with the winding pattern. The individual winding coils 3 are made and connected to motor phases preferably directly during the winding operation by winding a wire in one slot 1 to form a coil and, once the coil is made, deflecting the wire in accordance with a winding pattern to another slot 1 for continuing the winding for the next coil, and so forth. In this way, the number of contact areas during connection of the coils to the motor phases can be reduced, thereby simplifying the manufacture and increasing the reliability.

Of course, it is also conceivable to wrap several coils simultaneously because the wires of different coils do not intersect during a winding process, i.e. during complete winding of a coil. Preferably, all coils are initially wrapped in one winding direction and subsequently all coils are wrapped in the opposite direction. As the wrap-around direction during winding of the coils is changed only once, the overall winding time is shorter. One coil may also be wound with several parallel wires. As the wires supplied during winding to a slot 1 can be connected to different coils, it is possible to wind several coils at the same time. In other words, a double-layer winding can be realized.

Figure 3:
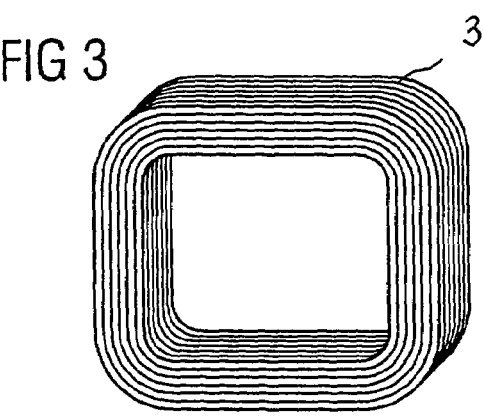
FIG. 3 is a perspective illustration of a single winding coil.
Figure 9:
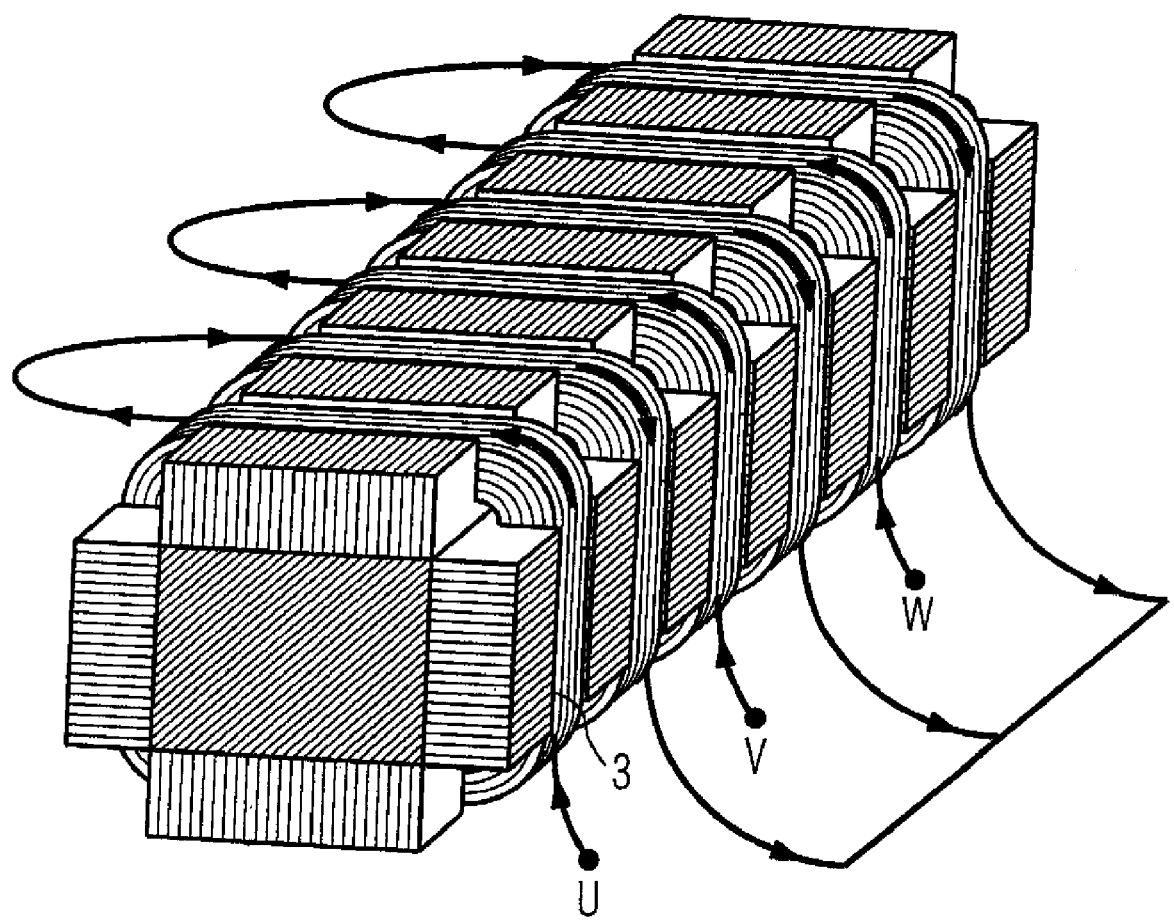
FIG. 9 is a perspective illustration of the primary with windings connected to form a lap winding structure.
Figure 10:
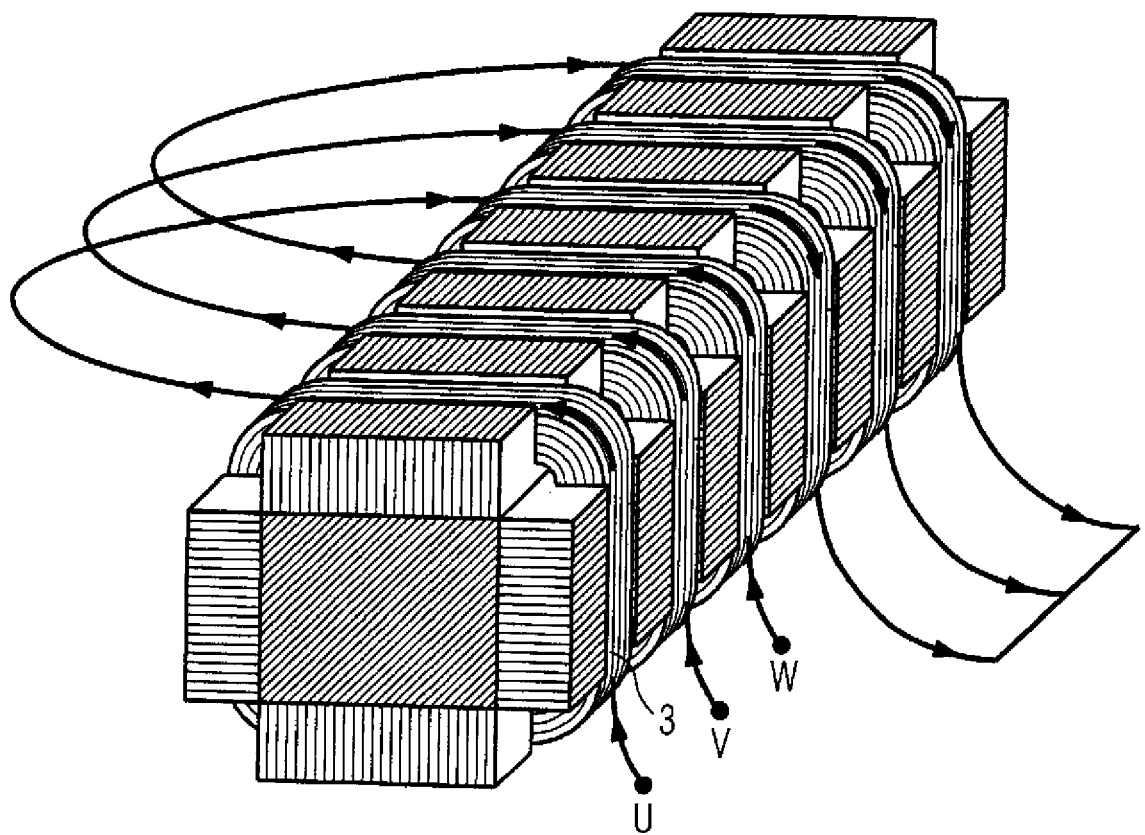
FIG. 10 is a perspective illustration of the primary with windings connected to form an exciter coil winding structure.

Connection of the ring-shaped coils 3 to a phase winding may be realized in accordance with an exciter coil winding pattern, as shown by way of example in FIG. 9 with reference to a three-phase (U, V. W) exciter coil winding or a lap winding pattern, as shown by way of example in FIG. 10 with reference to a three-phase (U, V. W) lap winding. As shown in FIG. 3, the wrap-around winding in the slots 1 has a polygonal configuration and extends in substantial parallel relationship to the outer periphery of the core 6, thereby reducing the length of the winding ends. In other words, the length of electromagnetically inactive portions of the coil is shorter, thereby decreasing loss power and increasing efficiency.

Figure 4:
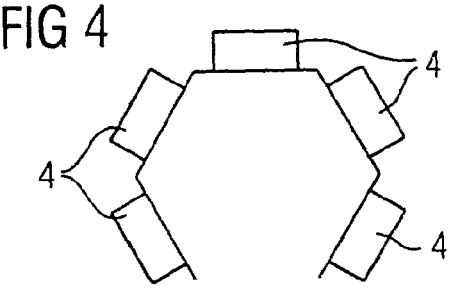
FIG. 4 is a schematic illustration of another embodiment of a primary according to the present invention with open polygonal configuration.

A linear motor according to the present invention does not require the disposition of a lamination stack 4 on all sides of the polygonal configuration. Rather, as shown by way of example, in FIG. 4, the linear motor may have an open polygonal configuration, of which only five of six sides have arranged thereon a lamination stack 4.

Figure 5B:
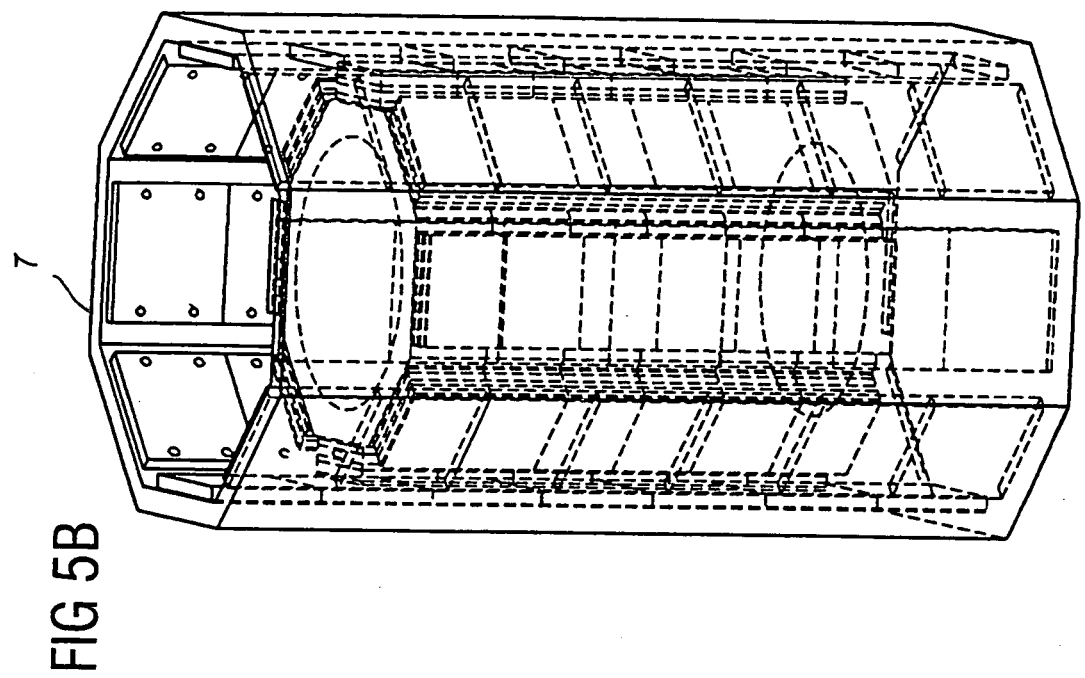
FIG. 5B is a perspective illustration of the polygonal motor of FIG. 5A.
Figure 5A:
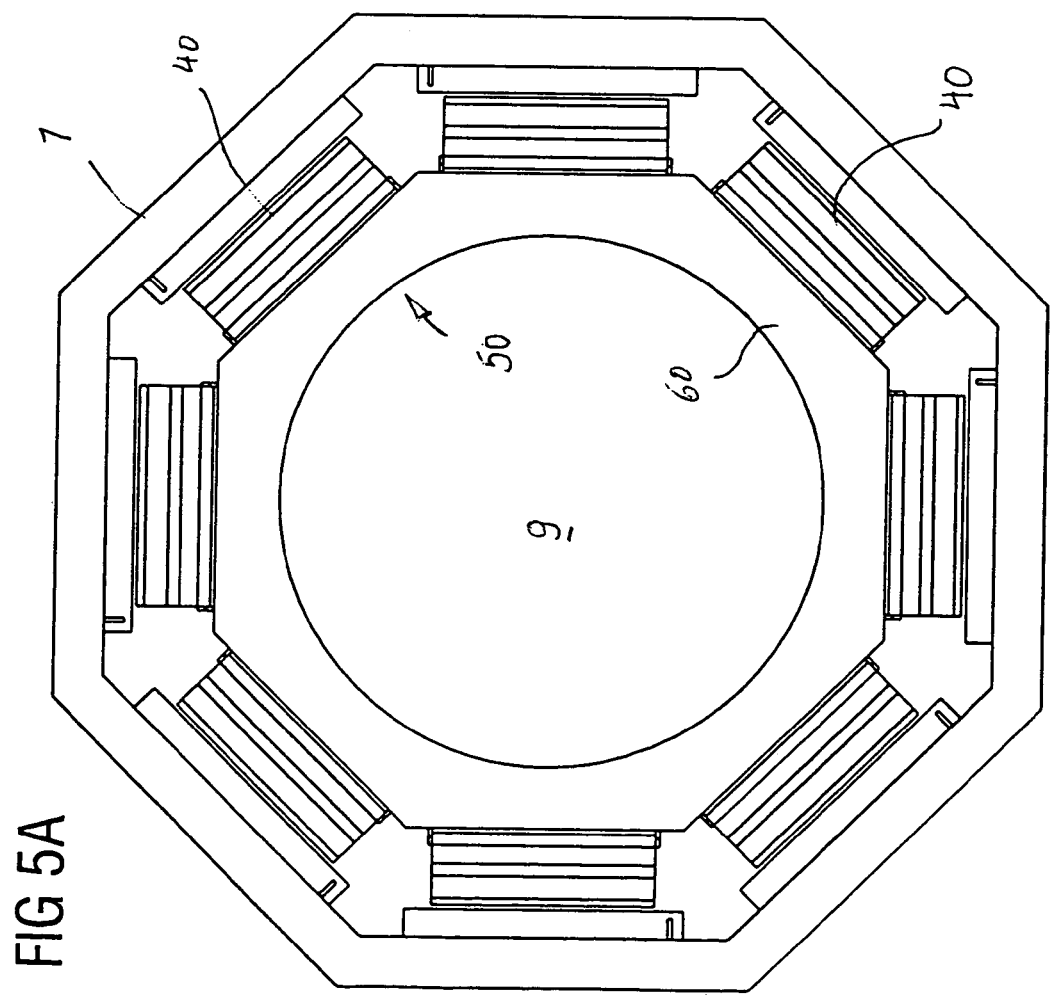
FIG. 5A is a schematic cross sectional illustration of a polygonal motor with yet another embodiment of a primary according to the present invention having eight lamination stacks, and a pertaining secondary.

Referring now to FIGS. 5A and 5B, there are shown a schematic cross sectional illustration and a perspective illustration of another embodiment of a polygonal motor having a primary according to the present invention, generally designated by reference numeral 50, and a secondary 7 in surrounding relationship to the primary 50. In describing the linear motor of FIGS. 5A and 5B, like parts corresponding with those of the primary in FIG. 1 will be identified by corresponding reference numerals followed by a "0". The description below will center on the differences between the embodiments. In this embodiment, the primary 50 has a core or carrier 60 which is formed with a central circular bore 9 for receiving, e.g., a shaft, and has an octagonal configuration for support of eight lamination stacks 40.

Figure 6:
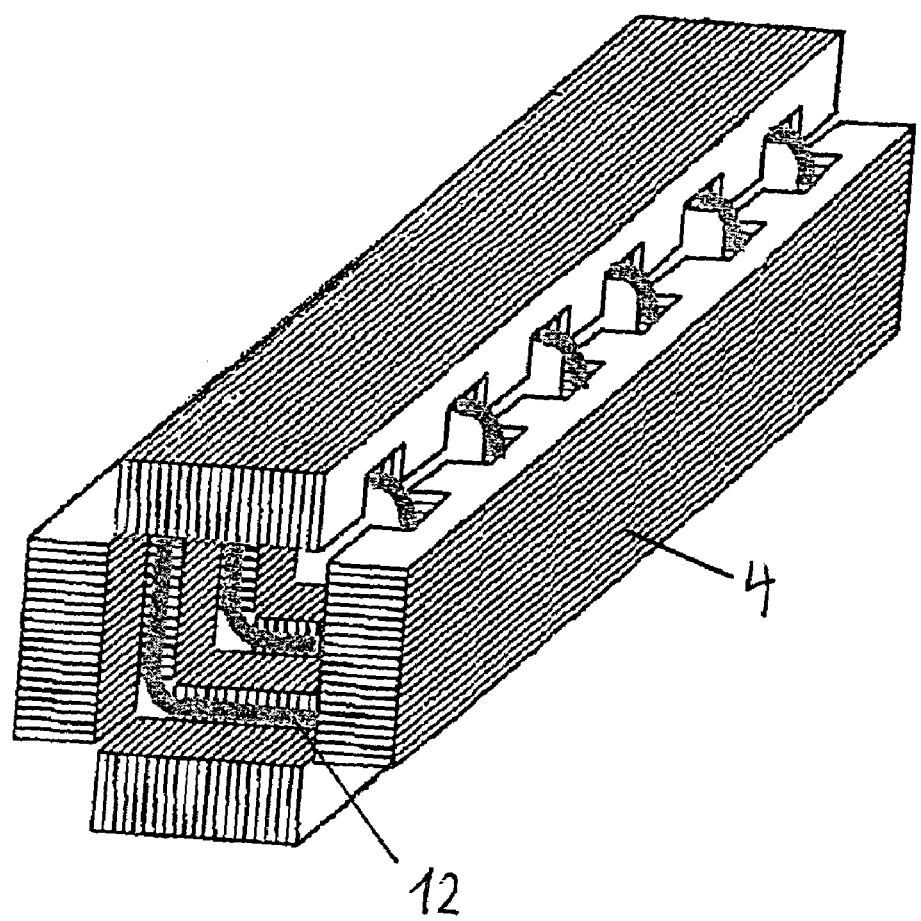
FIG. 6 is a perspective illustration of a linear motor with outside primary and inside secondary.

As described above, a linear motor according to the present invention may also be configured with a primary on the outside and a secondary on the inside, as shown by way of example in FIG. 6. The lamination stacks 4 are here directed inwardly. Compared to the provision of an inside primary, winding a coil onto an outside primary is, however, more complex as the ring coils 12 normally have to be pre-fabricated and then assembled to complete the primary.

Figure 7:
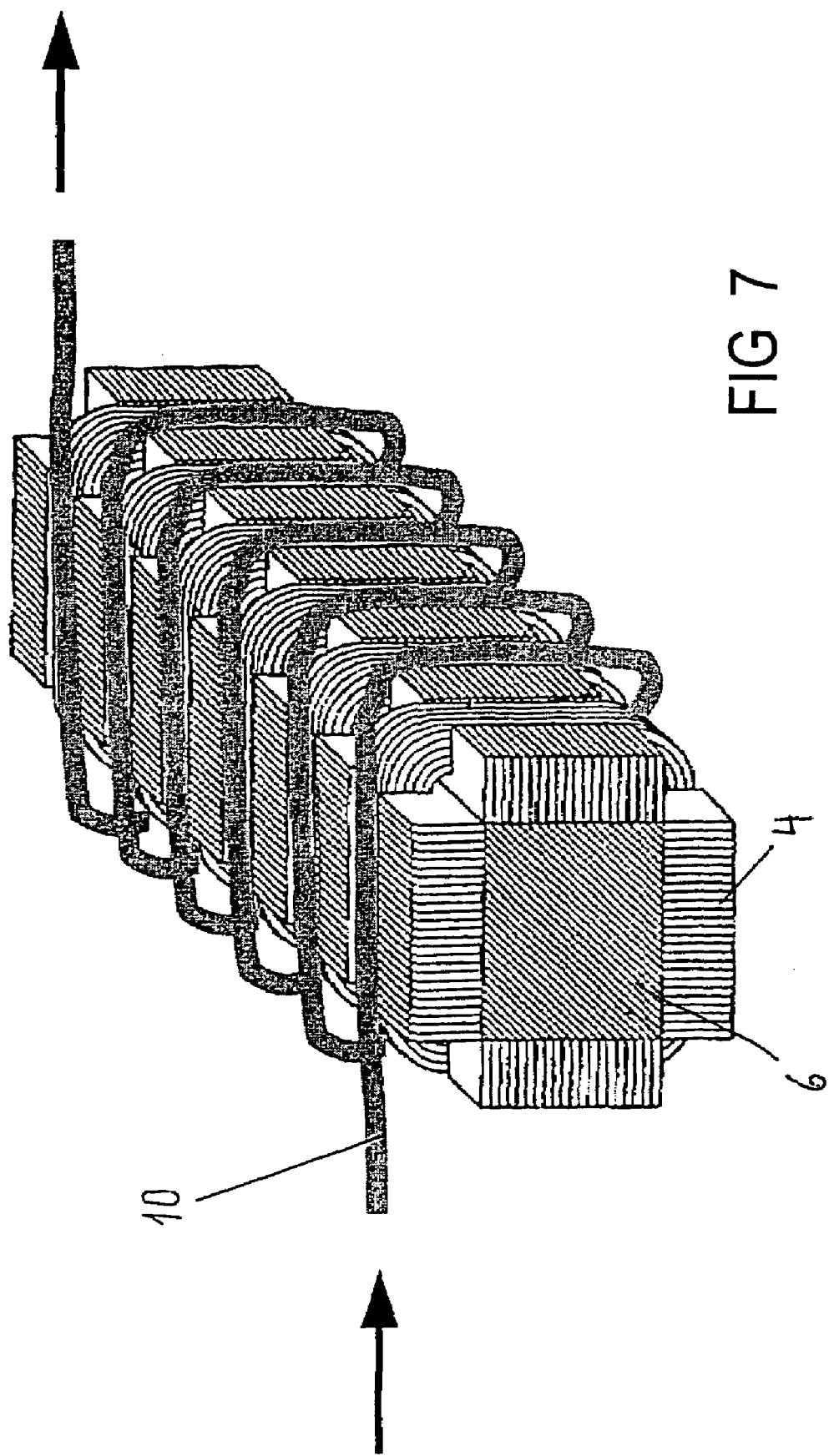
FIG. 7 is a perspective illustration of the primary with windings of FIG. 2 and equipped with a cooling system.
Figure 8:
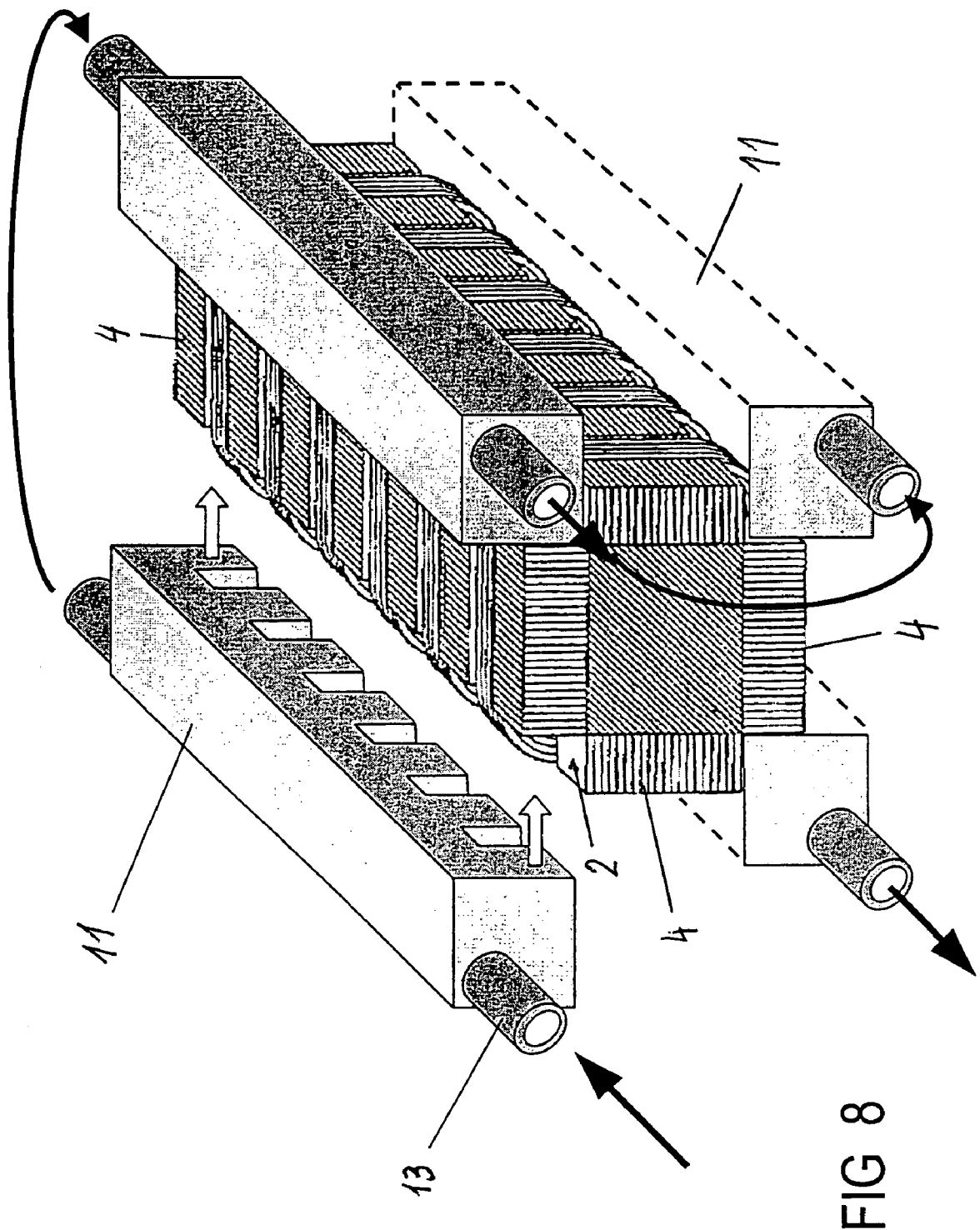
FIG. 8 is a perspective illustration of the primary with windings of FIG. 2 and equipped with a modified cooling system.

Referring now to FIG. 7, there is shown a perspective illustration of the linear motor 5 according to the present invention with an effective cooling system including a cooling coil 10 substantially in the form of a helix winding from start to end of the linear motor, as indicated by the arrows. In this way, thermally inactive deflection zones are avoided and the overall length of the cooling coil can be kept short, thereby decreasing pressure loss. A variation of a cooling system is shown in FIG. 8 by way of a perspective illustration, in partly exploded view, of the linear motor 5. In this embodiment, the cooling system includes a cooling pipe 13 which is partly received in thermally conductive casting bodies 11 that are respectively placed in and fill out wedge-shaped spaces 2, also shown in FIG. 1A, between neighboring lamination stacks 4.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A linear motor, comprising:
   a primary including lamination stacks which are arranged to realize a polygonal configuration of the primary, and winding coils having windings extending circumferentially in substantial parallel relationship to a circumference of the primary, each said lamination stack made up of elongate sheets which extend in parallel relationship to a center axis of the motor, wherein the polygonal configuration defines several sides, at least one of the sides is characterized by an absence of a lamination stack, and more than two sides are characterized by the presence of a lamination stack; and
   a secondary,
   wherein the secondary is in surrounding relationship to the primary, or the primary is in surrounding relationship to the secondary.

2. The linear motor of claim 1, wherein the lamination stacks are formed with slots, each of the slots containing at least one of said winding coils.

3. The linear motor of claim 1, wherein the windings are connected to form an exciter coil winding structure.

4. The linear motor of claim 1, wherein the windings are connected to form a lap winding structure.

5. The linear motor of claim 1, further comprising a cooling coil extending in the form of a helix from one end of the linear motor to another end of the linear motor.

6. The linear motor of claim 1, wherein neighboring lamination stacks define a space, and further comprising casting material received in the spaces and having thermally conductive characteristics to provide a cooling action.

7. A linear motor, comprising:
   a primary including a polygonal core having several sides and defining a longitudinal axis, lamination stacks mounted to more than two sides but less than all sides of the core, with each said lamination stack made of superimposed elongate sheets which have slots formed therein and extend in parallel relationship to the longitudinal axis of the core, and winding coils defined by an axis and so wrapped about the slots in the sheets that the axis of the winding coils extends in substantial parallel relationship to the longitudinal axis of the core; and
   a secondary interacting with the primary for movement of the primary in relation to the secondary,
   wherein the secondary is in surrounding relationship to the primary, or the primary is in surrounding relationship to the secondary.

8. A primary for a linear motor, comprising:
   a polygonal core having several sides and defining a longitudinal axis;
   lamination stacks mounted to more than two sides of the polygonal core in surrounding relationship to the polygonal core but to less than all sides of the core, with each said lamination stack made of superimposed elongate sheets which have slots formed therein and extend in parallel relationship to the longitudinal axis of the core; and
   winding coils defined by an axis and so wrapped about the slots in the sheets that the axis of the winding coils extends in substantial parallel relationship to the longitudinal axis of the core.

9. A kit for assembly of a primary for a linear motor, comprising:
   a polygonal core having several sides and defining a longitudinal axis;
   a plurality of elongate sheets having formed therein slots for making a selected number of lamination stacks for attachment to more than two sides of the polygonal core in surrounding relationship to the polygonal core but to less than all sides of the core; and
   conductor wires for wrapping about the slots of the sheets and thereby form winding coils having an axis in substantial parallel relationship to the longitudinal axis of the core.

* * * * *